(12) United States Patent
Gawn et al.

(10) Patent No.: US 9,333,710 B2
(45) Date of Patent: May 10, 2016

(54) LAMINATE STRUCTURE (75) Inventors: Marcus Gawn, East Cowes (GB); Paul Anderson, East Cowes (GB); Giovanni Marengo, East Cowes (GB)

(73) Assignee: GKN Aerospace Services Limited, East Cowes, Isle of Wight, Hampshire (GB)

( * ) Notice: Subject to any disclaimer, the term of this patent is extended or adjusted under 35 U.S.C. 154(b) by 205 days.

(21) Appl. No.: 13/882,615

(22) PCT Filed: Oct. 27, 2011

(86) PCT No.: PCT/GB2011/052091
§ 371 (c)(1),
(2), (4) Date: Apr. 30, 2013

(87) PCT Pub. No.: WO2012/059740
PCT Pub. Date: May 10, 2012

(65) Prior Publication Data
US 2013/0251958 A1    Sep. 26, 2013

(30) Foreign Application Priority Data

Nov. 5, 2010   (GB) .................................. 1018753.2

(51) Int. Cl.
| B29C 70/00 | (2006.01) |
| B29C 70/02 | (2006.01) |
| B29C 70/08 | (2006.01) |
| B29C 70/30 | (2006.01) |
| F01D 25/24 | (2006.01) |

(52) U.S. Cl.
CPC ............. *B29C 70/021* (2013.01); *B29C 70/083* (2013.01); *B29C 70/30* (2013.01); *F01D 25/24* (2013.01); *Y10T 156/10* (2015.01); *Y10T 428/24752* (2015.01)

(58) Field of Classification Search
CPC .......... Y10T 156/1089–156/1095; B29C 53/66
USPC .......... 156/148, 149, 184–190, 195, 297–301; 264/103
See application file for complete search history.

(56) References Cited

U.S. PATENT DOCUMENTS

| 3,519,520 A * | 7/1970 | Newman, Jr. ................. 156/431 |
| 3,784,441 A * | 1/1974 | Kaempen ...................... 428/112 |
| 2003/0186038 A1 | 10/2003 | Ashton et al. |
| 2004/0074592 A1 | 4/2004 | Ashton et al. |
| 2006/0180270 A1 | 8/2006 | Ledet et al. |

FOREIGN PATENT DOCUMENTS

| DE | 40 05 772 A1 | 9/1991 | |
| DE | 4005772 A1 * | 9/1991 | .............. B29C 53/56 |
| EP | 0 064 151 A1 | 3/1981 | |
| EP | 0 396 281 A2 | 11/1990 | |

(Continued)

OTHER PUBLICATIONS

International Search Report and Written Opinion under date of mailing of Mar. 26, 2012 in connection with PCT/GB2011/052091.

(Continued)

*Primary Examiner* — Carson Gross
(74) *Attorney, Agent, or Firm* — Bejin Bieneman PLC (57) ABSTRACT

A method of forming a composite component in which the component comprises a series of sub-layers and in which the sub-layers are offset with respect to one or all of the other sub-layers forming the composite component.

14 Claims, 11 Drawing Sheets

(56) References Cited

FOREIGN PATENT DOCUMENTS

| | | |
|---|---|---|
| EP | 0 396 281 A3 | 1/1992 |
| EP | 2 353 847 A1 | 1/2010 |
| GB | 2485215 A | 5/2012 |
| JP | S57-186623 U | 11/1982 |
| JP | H02-303836 A | 12/1990 |
| JP | 2001524169 A | 11/2001 |
| JP | 2008068626 A | 3/2008 |
| JP | 2010530319 A | 9/2010 |
| WO | 98/17852 A1 | 4/1998 |
| WO | 99/20973 A1 | 4/1999 |
| WO | 2009090397 A1 | 7/2009 |
| WO | 2010060908 A2 | 6/2010 |

OTHER PUBLICATIONS

Examination REport for EP Application No. 11778944.6-1703 dated Mar. 4, 2015 (4 pages).

Chinese Office Action for Application No. 2011800642073.X dated Aug. 5, 2015 (English Translation; 5 pages).

Japanese Office Action for Application No. 2013-537202 mailed Sep. 15, 2015 (English Translation; 6 pages).

* cited by examiner

LAMINATE STRUCTURE

CROSS-REFERENCE TO RELATED APPLICATIONS

This application represents the national stage entry of PCT International Application No. PCT/GB2011/052091 filed Oct. 27, 2011, and claims the benefit of Great Britain Application No. 1018753.2 filed Nov. 5, 2010. The contents of both of these applications are hereby incorporated by reference as if set forth in their entirety herein.

FIELD OF THE INVENTION

The present invention relates to a method of forming a monolithic composite component with improved structural and impact properties. Particularly, but not exclusively, the invention relates to an improved fan containment case for a gas turbine engine or the like.

BACKGROUND

Composite materials have been employed in the aerospace industry for a number of years. The term composite material (also known more generally as 'composites') is used to describe materials comprising fibres such as carbon, glass or the like and an epoxy resin (or similar). Composite materials offer significant advantages for aerospace applications such as lower weight, improved fatigue/damage resistance, corrosion resistance and negligible thermal expansion.

The use of these materials has increased throughout the aerospace industry predominantly because of the fuel savings which can be achieved over the life of an aircraft by reducing the overall sum weight of the components making up the aircraft. Aerodynamic as well as structural components are formed of carbon fibre materials.

However, the inventors have established a limitation in the use of composite materials (such as carbon fibre) for components which are prone to possible impact or contact damage. Specifically, it has been established that conventional manufacturing methods do not provide components which are capable of withstanding the sort of impacts which can occur in aerospace applications.

One such application in the aerospace industry is the fan containment case (sometimes referred to as a fan case) of a gas turbine engine. Fan cases are designed to absorb the impact of all or part of a blade in the event of fracture or damage, for example caused by a bird being ingested into the engine. Without the fan case all or part of the blade could impact the fuselage and/or fuel tank causing catastrophic damage.

The present invention aims to provide a composite component with improved impact qualities and more specifically a component suitable for use as in fan containment case application.

INVENTION SUMMARY

According to a first aspect of an invention described herein there is provided a method of forming a composite component, said component comprising a series of sub-layers together forming a composite stack, each sub-layer comprising a plurality of plies;
said method comprising the steps of:
selecting a start position for laying up a first sub-layer of plies;
laying-up from said position a plurality of plies to form a first sub-layer; and
laying-up a plurality of subsequent sub-layers of composite plies each layed-up on top of a preceding sub-layer;
wherein the start position for laying-up each subsequent sub-layer is selected so as to be displaced laterally with respect to the start position of the preceding sub-layer.

Thus, according to the present invention there is provided a composite stack with a series of sub-layer or groups of plies wherein the sub-groups are displaced with respect to the other sub-layers in the stack. This advantageously results in each of the plies within the sub-layer being displaced with respect to the same plies extending in the same direction in adjacent sub-layers.

In effect the boundaries defining the edges of the plies do not then align vertically (when viewed through the stack) with other ply boundaries. The inventors have established that alignment of plies in the same direction through a stack of composite material results in a cumulative protrusion or 'bulge' being created on the outer surfaces of the composite stack. This is caused by the repeated alignment of ply boundaries or joint butts. According to the present invention plies in common directions are displaced to prevent this alignment occurring.

This feature of the present invention provides at least two advantages.

First, the non or mis-alignment of ply boundaries permits a composite part to be formed with a significant improvement in surface finish i.e. the surface finish of the plies defining the inner and outer surfaces of the component are substantially more uniform that with conventional techniques. This provides significant advantages both aesthetically and technically for the component. For example, in an aerospace application a smooth and uniform surface provides a significant advantage to the aerodynamic properties of the part.

Secondly, the non or mis-alignment of the ply boundaries significantly improves the structural performance of the component. In particular the mis-alignment prevents the propagation of cracks or break lines in the component which might occur and travel along the boundaries of adjacent plies and thereby through the component. The mis-alignment of the boundaries prevents propagation from occurring and improves the structural strength of the component. In particular it has been established that the impact performance of the component can be significantly improved.

The component may be any suitable shape corresponding to the desired application provided that plies in each sub-layer are arranged such that plies extending in common directions are displaced laterally with respect to at least the adjacent plies. It will be recognised that not all plies need to be displaced in this way but it has been established that increasing the displacement can improve the structural strength of the part. Plies may advantageously be layed-up so that all plies are prevented from being in alignment with each other.

The component may for example be substantially planar, in which case the sub-layers forming the stack would be aligned vertically with respect to one another and the lateral displacement measured in the x and y directions where the x and y axis correspond to the length and width of the component (not its depth).

The term lateral displacement is intended to refer to the displacement of the start position of the first ply of a sub-group measured in a direction corresponding to the width of the ply or the length of the ply i.e. not in a depth or thickness direction of the ply. Put another way, and with reference to FIG. 1B, if the width and length of the plies are measured along x and y coordinates and the depth along the z then the lateral displacement refers to a displacement only in the x and y directions.

It is this lateral displacement with respect to an adjacent and other plies in the same direction that provides the advantageous features of the mis-alignment of ply boundaries or edges through the stack.

Figure 1A:
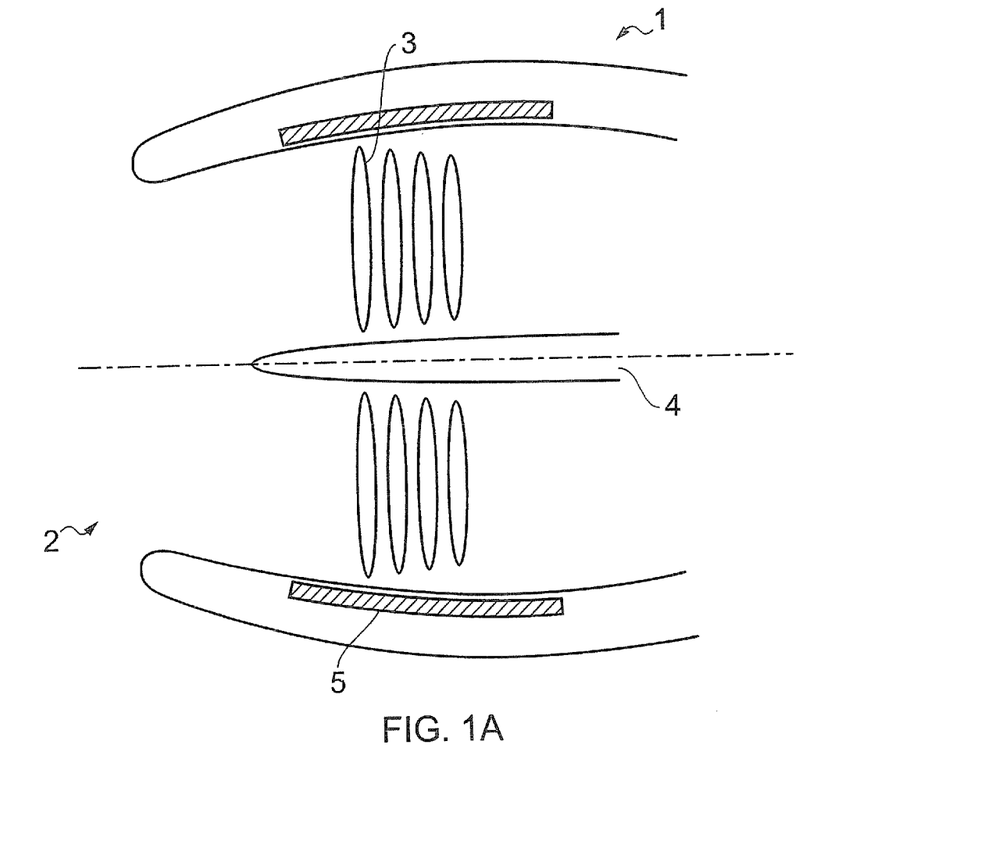
FIG. 1A shows a cross-section through a gas turbine engine.
Figure 1B:
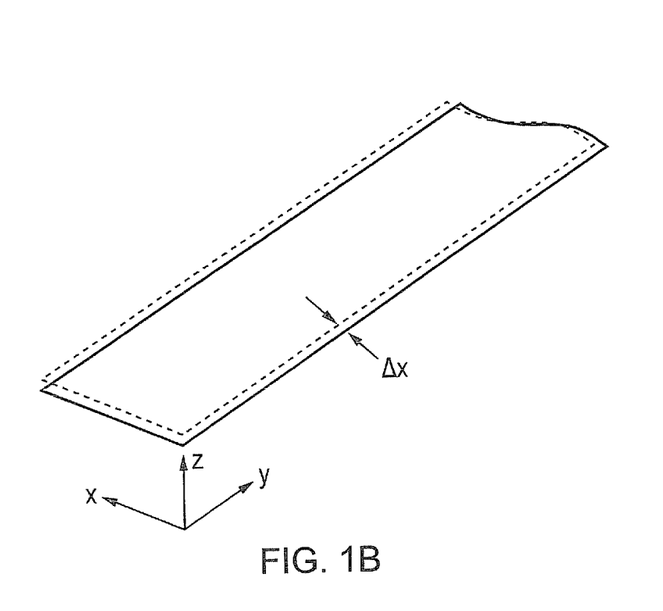
FIG. 1B illustrates the axes of a ply according to an embodiment of the invention.

It will be further recognised that the lateral displacement may be along one of the axes i.e. displaced in a direction along the elongate axis of the ply (the y axis shown in FIG. 1B). Alternatively it may be displaced is a direction along the width axis of the ply (the x axis shown in FIG. 1B). In the latter arrangement it will recognised that the distance of possible displacement is less than that available along the elongate axis of the ply. Advantageously the displacement may be in both the x and y directions.

The component itself may for example be a cylindrical component, for example having the dimensions corresponding to the desired dimensions of a gas turbine fan case. In such an arrangement the plies may be arranged to spiral around the component (to maximise strength) and in such a case it will be recognised that the term laterally is intended to refer to a displacement along the width axis and/or the length axis of the relevant ply i.e. circumferentially or axially with respect to the mandrel.

The plies themselves may be any suitable shape for the given application. However the use of plies which are substantially longer than they are wide advantageously allows more complex components to be manufactured such as cylindrical shapes. For example the plies may be in the form of an elongate tape facilitating storage and application.

The laying-up process of composite plies to make composite components is itself well known to those skilled in the art. The purposeful mis-alignment of plies in the same direction is not.

The laying-up process may advantageously be performed on a suitably programmed auto-lay-up machine (an automatic fibre placement machine or the like) capable of laying down a tape over a suitable mandrel corresponding to the desired component profile.

As stated above, the displacement may be arranged in one or two directions i.e. the start position of the lay-up of a subsequent sub-layer may be displaced in both an x and a y direction (x and y corresponding to the elongate and width directions of the tape for example in FIG. 1B). Thus, plies in common directions will be displaced or off-set in two directions thereby preventing not only the alignment of the elongate boundaries (y direction boundaries) but also the alignment of the width boundaries (x direction boundaries). This advantageously improves the strength still further.

The displacement may be arranged for example so that the boundaries are only off-set for the current ply and the preceding ply in a given common direction. Advantageously the sub-layers, and thereby the plies forming the sub-layer, may be offset so that all plies in a common direction are off-set with respect to other plies in the same direction but in different sub-layers.

The displacement concept may be applied to sub-layers i.e. the sub-layers may be displaced laterally. Additionally or alternatively plies forming the sub-layers may be displaced laterally in the same way (where there are multiple plies extending in the same direction which are layed-over one-another).

The term direction will be understood to the person skilled in the art of composite component design. The component may advantageously be provided with sub-layers comprising plies in a plurality of directions. For example plies may be arranged in three directions: minus 60 degrees, 0 degrees and plus 60 degrees. The nomenclature for such a ply lay-up would be [−60, 0, +60]. The angle value being measured from a preselected datum of the component but common to all sub-layers and all plies.

According to the invention the plies are lay-up in sub-layers or sub-groups commencing from the start position of the first sub-group. The first layer is layed-up onto the mandrel and the subsequent plies forming each sub-layer layed-up on top of the preceding sub-layer until the complete stack is formed. According to the invention the start position of the lay-up (for example the start position of the auto-lay-up machine) is moved according to the desired displacement in the x and y directions and the next sub-layer layed-up according to the predetermined ply direction pattern.

It will be recognised that any suitable number of directions may be employed in each sub-layer according to the structural strength requirements of the component in each of said directions.

The plurality of plies forming the sub-layers may be layed-up so as to be immediately adjacent to one another. That is, a plurality of plies may be layed-up in the same direction, for example substantially straight for a planar component or in a spiral for a cylindrical component. The plies are advantageously all substantially parallel so as to improve the uniformity of the component. Aligning the plies in this way provides an uninterrupted layer of plies in a first direction before the next layer of plies in the next direction are layed-up on top of this first layer. This process can be repeated until the complete sub-layer is layed-up.

Advantageously however the inventors have established that an improved lay-up sequence can be employed to further enhance the geometric qualities of the sub-layer and additionally the structural performance of the sub-layer.

Specifically, the sequence of laying-up plies is such that the plies in a common direction and forming a sub-layer are layed-up so as to be separated from adjacent plies by a distance substantially equal to the width of the ply. In effect a series of parallel plies are lay-up each separated by a width equal to the width of the ply (for example a tape). Then a plurality of plies are layed-up in a second and subsequent directions all separated by the same spacing. When parallel and spaced apart plies have been layed-up in each of the directions, plies are then layed-up in the spaces defined between adjacent plies in each of said directions. In effect all of the spaces are 'filled in' with a ply.

Parallel plies may be layed-up with spaces substantially equal to the width of the ply or alternatively separated by a multiple of the width of a ply.

This lay-up pattern creates interconnections between plies in each direction. In effect the plies overlap each other in a complex way. Once the part it cured the resin consolidates the component binding the plies and therefore the fibres into a complex and interconnected three dimensionally arrangement. Thus a sub-layer is created with a complex interaction of fibres all bound within the cured resin.

This lay-up sequence may advantageously be coupled with the displacement of the start positions of each sub-layer lay up so as to provide a component with a complex fibre structure limiting the possibility of crack propagation and optimising strength.

The inventors have further established that a particular displacement profile or pattern of the sub-layers (with respect to other sub-layers) can still further enhance the component's properties.

Specifically the lay-up start position of the first sub-layer may define a datum extending from the first to the final sub-layer of the composite stack. As stated above the first layer is layed-up onto the mandrel or tooling.

Advantageously the lay-up start position of each subsequent sub-layer may be displaced so as to alternate between each side of said datum. Alternating the lay-up start position between either side of this arbitrary datum line extending through the stack means that not only are ply boundaries prevented from overlapping one another but they are advantageously separated by an increased distance. Increasing the distance of separation advantageously improves the structural strength by further preventing crack propagation through the stack and/or delamination of plies/sub-layers. This is illustrated with reference to FIG. 9 described in detail below.

Still further it has been established that the alternating displacement can itself be optimised.

Specifically, the inventors have established that a predetermined unit distance can be used to optimise the component performance. Accordingly, a displacement distance a is predetermined which corresponds to the width of the tape ply divided by the number of plies per sub-layer:

distance $a$=ply width/number of plies

The start position of the first ply (defining the start position of the first sub-layer) is layed-up and this sets the origin or datum of subsequently sub-layer start positions. The lay-up start position of each subsequent sub-layer is then displaced relative to said datum according to the following sequence:

0, $-a$, $+a$, $-2a$, $+2a$, $-a$, $+a$, 0

The predetermined distance a may be measured along either or both of the first and or second axes of the plies i.e. either along the elongate y direction of the ply and/or the width direction x of the ply (as shown in FIG. 1B).

Figure 9:
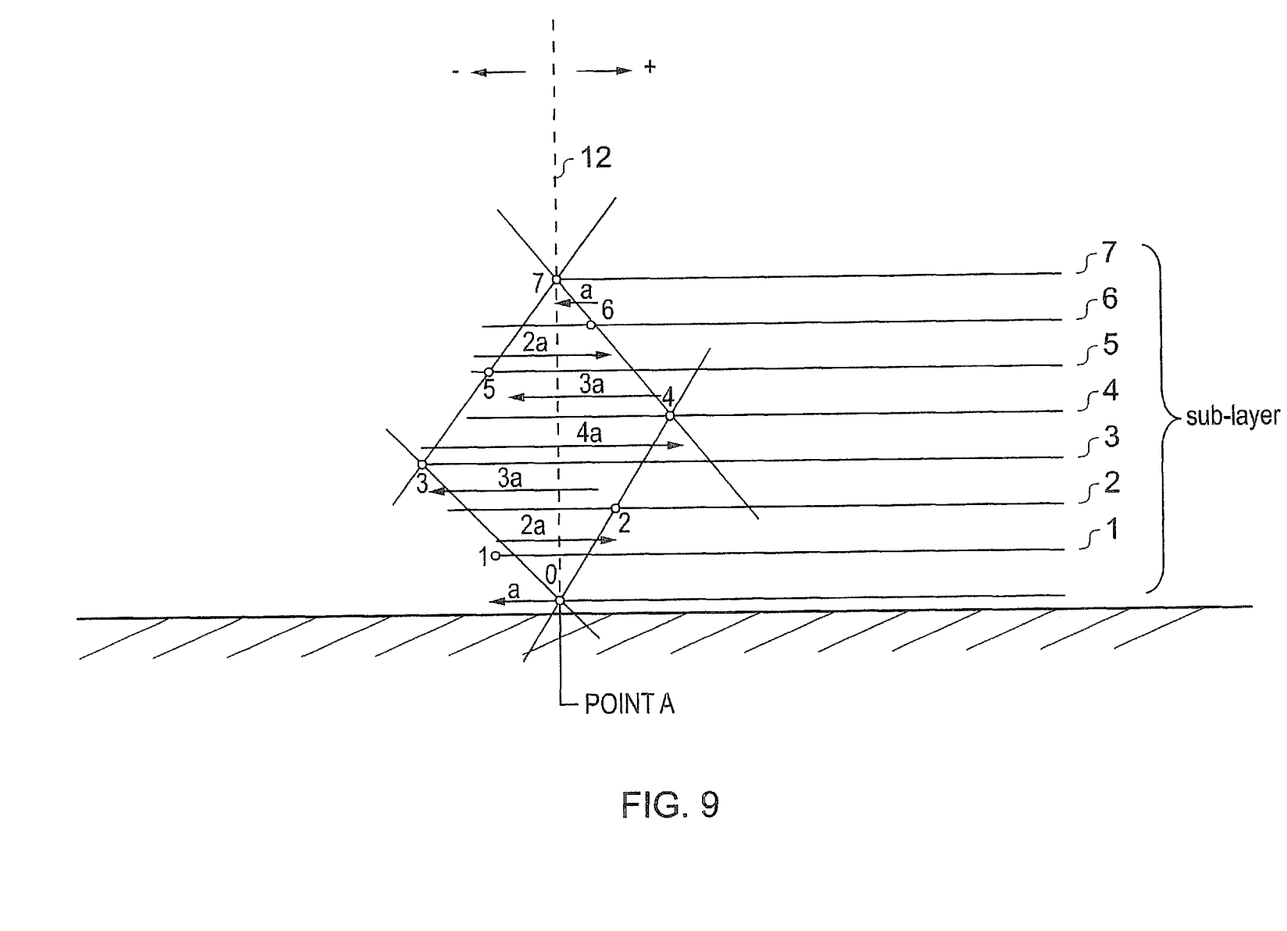
FIG. 9 shows a lay-up sequence for the sub-layers forming the composite stack.

In the example sequence above an 8 sub-layer composite stack is created as shown in FIG. 9 and described further below. The value zero indicates the first and final sub-layer position i.e. the final sub-layer is layed-up immediately over the start position of the very first sub-layer.

This arrangement creates a 'diamond shape' of butt joints between plies when viewed through the thickness of the component. Such a pattern has been established to be optimal for structural performance since the majority of butt joints (that is the boundary or edge of a ply) on adjacent sub-layers are spaced far apart.

Once the complete stack has been layed-up it may be cured using any suitable technique. In one arrangement the stack may be transferred to an autoclave and cured to consolidate the resin at elevated temperature and pressure. Alternatively the stack may be cured in an out of autoclave method, using a vacuum bag technique at ambient or near ambient conditions. The various curing methods are known to persons skilled in the art.

In an arrangement where the component is layed-up around a cylindrical mandrel, for example to form a cylinder to a fan case, then the composite stack may be cured by heating the mandrel and surrounding the stack with a suitable vacuum bag to remove volatile gas during the cure. Again, the curing technique is known to the person skilled in the art.

In either cure method the resin flow and consolidates the part resulting in a hardened composite component.

The plies themselves may all be the same material. Alternatively to increase strength in certain parts of the component, for example where particular areas are identified as impact zones then alternatively materials may be used. For example Kevlar may be layed-up in a particular portion of the component (e.g. a fan case) at a location where impact is more likely to occur. This thereby improves the component strength further whilst minimising weight and material usage.

The component itself may become a sub-part of a larger component. For example the method according to the present invention may be employed on a sub-part of a fan case with the distal portions of the case being lay-up using a conventional ply arrangement. In such a situation the boundaries of the component layed-up according to the present invention may be interconnected with adjacent layed-up portions using a ramp technique or the like.

Viewed from another aspect there is provided a method of making a composite component, said component comprising a stack of composite plies grouped into discrete sub-groups of plies, each sub-group positioned immediately on top of a preceding sub-group; wherein each sub-group is lay-up such that lines defining the edge of a ply extending in a first direction in said sub-group do not directly overlap with lines defining an edge of a ply extending in the same direction in another one of said sub-groups of said stack.

Viewed from a still further aspect there is provided a composite component comprising a stack of composite plies grouped into discrete sub-groups of plies, each sub-group positioned immediately on top of a preceding sub-group; wherein each sub-group is arranged such that a line defining the edge of a ply extending in a first direction does not directly overlap with a line defining an edge of a ply extending in the same direction in one of the other of said sub-groups of said stack Viewed from a still further aspect there is provided a method of operating an auto fibre placement machine to form a composite component, said component comprising a series of sub-layers together forming a composite stack, each sub-layer comprising a plurality of plies;

said method comprising the steps of:

selecting a start position for laying up a first sub-layer of plies;

laying-up from said position a plurality of plies to form a first sub-layer; and laying-up a plurality of subsequent sub-layers of composite plies each layed-up on top of a preceding sub-layer;

wherein the start position for laying-up each subsequent sub-layer is selected so as to be displaced laterally with respect to the start position of the preceding sub-layer.

Viewed from yet another aspect there is provided a method of forming a composite component, said component comprising a series of sub-layers together forming a composite stack, each sub-layer comprising a plurality of plies; said method comprising the steps of: laying-up a plurality of plies to form each sub-layer wherein the plies forming each sub-layer are arranged to extend in a plurality of directions and wherein plies layed-up in the same direction are separated from adjacent plies by a distance substantially equal to the width of the ply.

The method may optionally comprise the step of laying-up plies over pre-layed plies along paths defined between adjacent plies in the same direction.

Aspects of the invention extend to a fan case for a gas turbine engine, to an aerospace component manufactured according to the invention and to a wind turbine component manufactured according to the invention.

It will of course be recognised with the benefit of the teaching of the present application that the method can be applied to any number of applications where structural strength and/or surface finish are important. It will also be recognised that an elongate pre-impregnated tape according to the present invention is distinct from a thread of fibres or a bundle of individual fibres (know in the art as tows).

As discussed above the present invention not only provides a method of manufacturing a composite component with an improved internal structure (inter-woven plies) but also exhibits significantly improved surface finished owing to the offset of ply butts/boundaries. A misalignment of joints through the component thickness prevents a 'quilting effect' which causes uneven component surface finishes.

Features described herein with reference to one embodiment or aspect may conveniently and advantageously be combined with each and every other aspect and embodiment defined herein.

BRIEF DESCRIPTION OF THE DRAWINGS

Embodiments of the invention will now be described by way of example only with reference to the accompanying drawings in which.

While the invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the scope of the claimed invention.

DETAILED DESCRIPTION

FIG. 1 shows a cross-section through a gas turbine engine. Specifically the cross-section shows the position of a fan containment case according to one application and embodiment of the present invention.

As see in FIG. 1 the gas turbine engine 1 comprises an inlet 2 for receiving air into the engine. The simplified figure illustrates the fan blades 3 located on the central rotatable shaft 4. It is a requirement of engine manufacture that some form of protective barrier is put in place around the turbine blades such that the complete or partial failure of one blade does not allow that part to travel radially out of the engine. It will be recognised that this could cause a catastrophic incident.

In order to prevent this from happening and to retain the blades within the engine a fan case 5 is located around the blades. It has been established that manufacturing this component from composite materials could significantly reduce the weight of the engine and thereby substantially increase fuel efficiencies of the engine and thus the aircraft itself. The application therefore has real environmental benefits.

The fan case 5 is formed of a generally cylindrical shape although the precise geometry will depend on the aircraft. The fan case may for example be a barrel shape with a 'bulged' waist and narrower distal ends.

Figure 2:
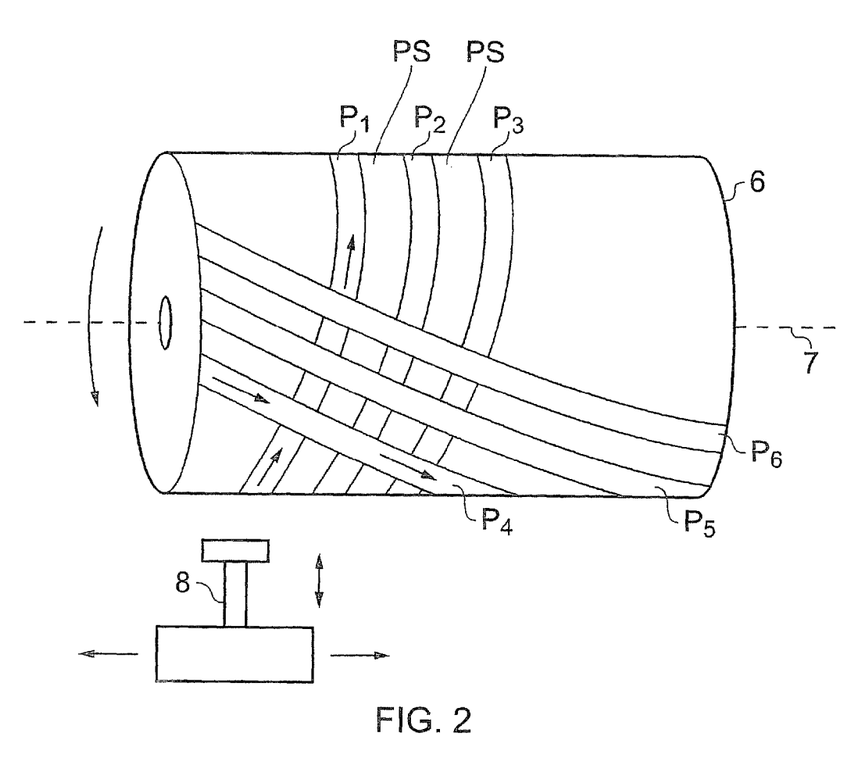
FIG. 2 shows an automated lay-up arrangement.

FIG. 2 shows a basic illustration of an auto lay-up machine arranged to form a component according to the present invention in a cylindrical shape.

It will be recognised that the invention is not limited to a cylindrical shape and can be applied equally to a curved, planar or other desired component.

In FIG. 2 a rotatable mandrel 6 is shown rotatable about elongate axis 7. A movable tape laying head 8 is shown which can move along the axis of the mandrel as well as radially in and out with respect to the mandrel surface. The tape laying head 8 is supplied with a continuous roll of preimpregnated tape.

The lay-up apparatus, that is the mandrel and lay up head, are computer numerically controlled and programmed to lay up plies according to a predetermined pattern.

In one example a carbon epoxy preimpregnated resin having a 75 mm width may be used. Other widths, such as a 150 mm wide tape may be used. It will be appreciated that the width of the tape is dependent on the particular component and the geometries of the component. The material could be layed-up manually but is preferably layed-up using a commercially available machine such as that manufactured by MTorres.

The present invention is not restricted to any particular resin/fibre combination. The present invention can in fact be advantageously applied to any tape based lay-up process or system.

In use the mandrel 6 is rotated about the axis 7 whilst simultaneously the tape head 8 moves and lays-up lines of tape (termed plies) onto the mandrel. The mandrel may be provided with a first peel ply layer to improve surface finish and to aid removal of the component from the mandrel. In this regard the mandrel itself may collapse inwardly once the part is cured to allow the component to be safely removed.

As shown in FIG. 2 a series of plies P1, P2, P3 have been layed-up in a generally spiral configuration around the mandrel. This may be a plurality of plies or a single helically would ply forming an equivalent series of parallel plies as illustrated in FIG. 2. These plies are layed-up at a first angle with respect to an arbitrary datum axis.

Figure 3:
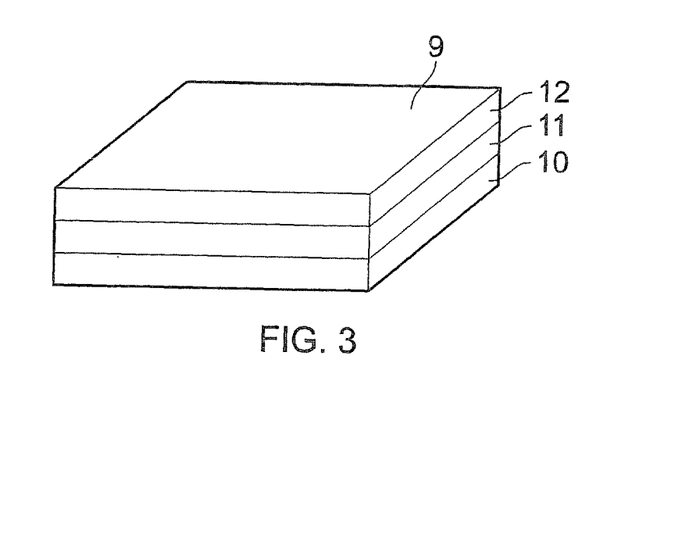
FIG. 3 shows a planar composite component stack according to the present invention.

FIG. 2 also shows a second series of plies P4, P5, P6 layed-up in a second direction. Although FIG. 2 shows two directions of layed-up plies it will be recognised that plies may be layed-up in any number of directions depending on the desired application. In FIG. 2 plies P1, P2, P3 are layed-up and then plies P4, P5, P6 are layed-up immediately on top of the first group. As shown spaces PS are left between adjacent plies. The width of the space PS is substantially equal to the width of the ply. FIG. 3 shows an alternative view of the invention applied to a planar surface. It will be recognised that the method described herein applies equally to both planar and cylindrical components. The planar shape is now described.

As shown in FIG. 3 the component is formed of a pre-cured stack 9 of composite material. The stack 9 is sub-divided into a plurality of sub-groups or layers. Each sub-layer comprises a plurality of plies. In FIG. 3 only three sub-layers are shown: sub-layers 10, 11, 12. Any number of sub-layers may be used.

Figure 4:
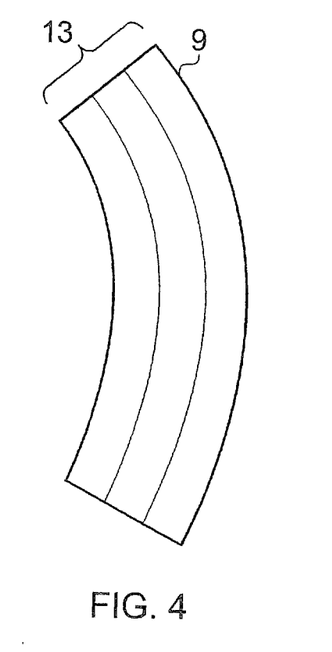
FIG. 4 shows a portion of a curved composite component stack according to the present invention.

FIG. 4 shows an alternative component profile, that is of a cross-section through a curved stack 9 with a plurality of sub-layers 13. Such a profile would correspond to a portion of a cross-section through a fan containment case manufactured according to the present invention.

Figure 5:
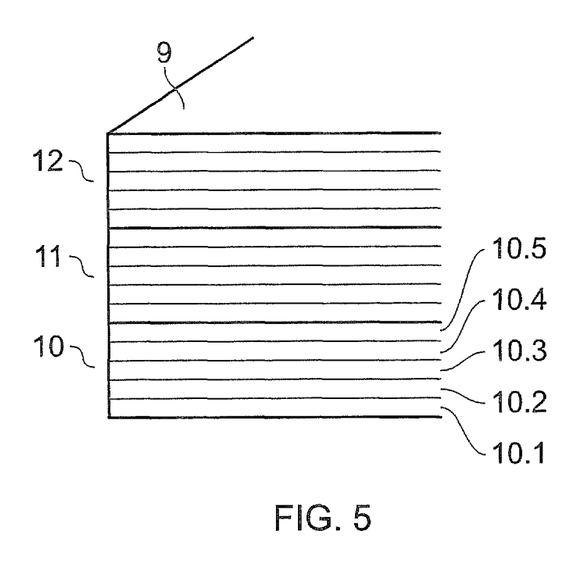
FIG. 5 shows a magnified cross-section of the structure shown in FIG. 3.

FIG. 5 is a magnified view of one portion of the cross-section of the stack 9 shown in FIG. 3. As shown each sublayer is formed of a plurality of individual plies 10.1, 10.2, 10.3 and so forth. Any suitable number of plies may be used to constitute each sub-layer 10, 11, 12.

As shown in FIGS. 3 to 5 each sub-layer is located on top of a preceding sub-layer to form the composite stack.

One sub-layer will now be described in more detail.

Each of the sub-layers comprises a series of plies extending in different directions. The actual angles of the plies with respect to one another are predetermined depending on the particular application of the component and are generally determined based on the forces which will be applied to the component.

Figure 6A:
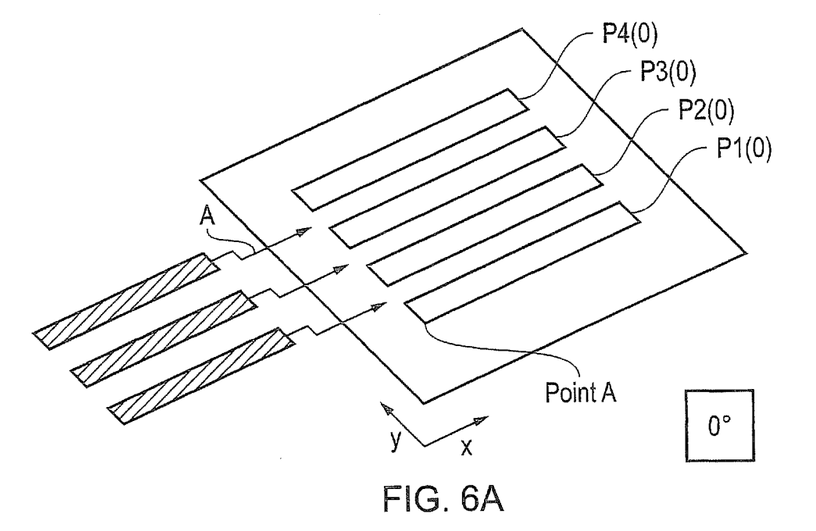
FIGS. 6A, 6B and 6C show the laying up sequence for sub-layer.
Figure 6B:
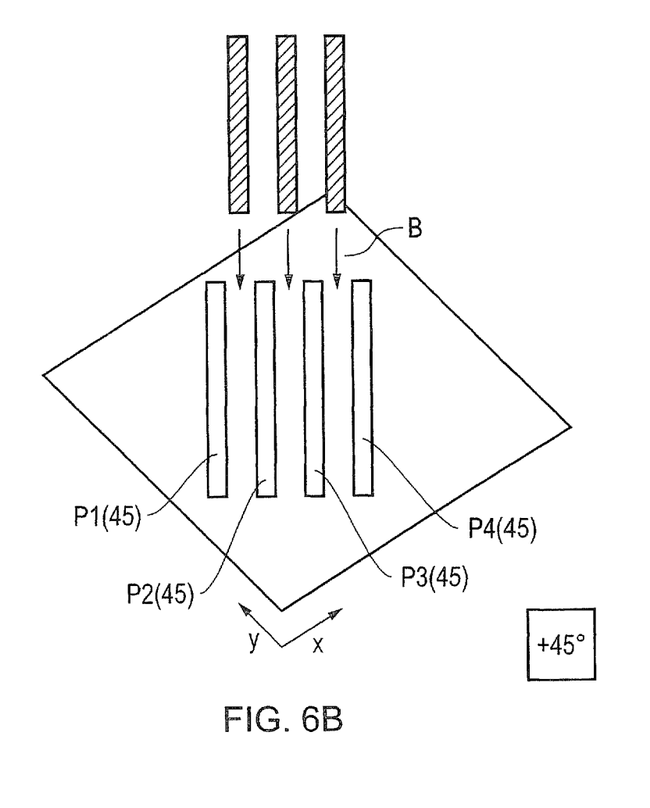
Figure 6C:
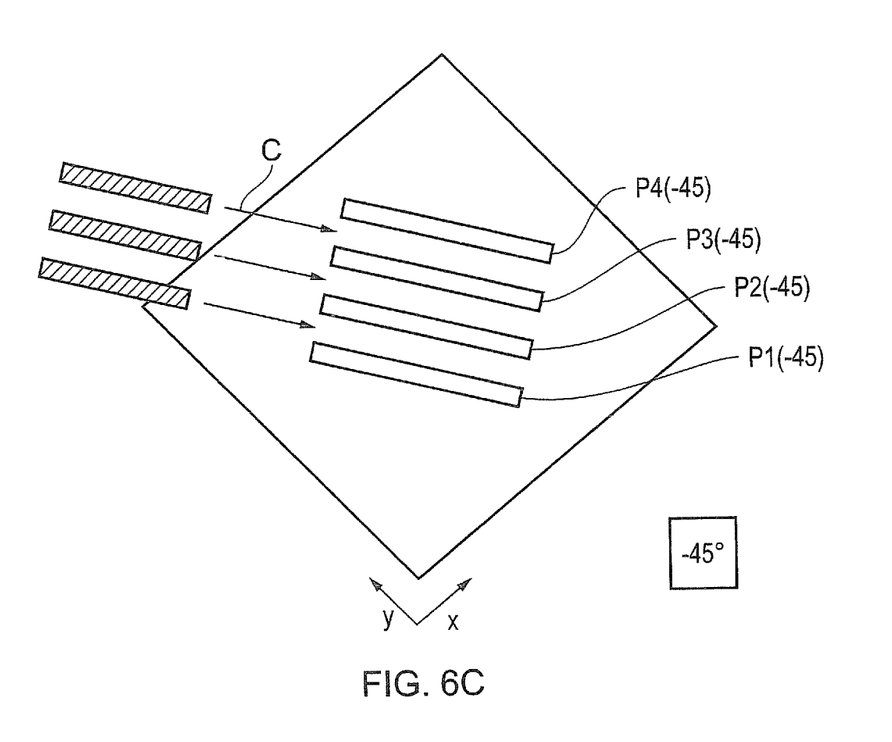

FIGS. 6A to 6C illustrate the lay-up process for one sub-layer. Here, three directions are to be employed −45 degrees, 0 degrees and +45 degrees [−45, 0, +45]. The auto-lay-up machine is configured to lay each of the parallel plies adjacent to each other and spaced from each other by a predetermined distance substantially equal to the width of the plies. Thus, a series of parallel plies is created with spaces therebetween sufficiently wide to accommodate a further ply in the same direction.

Referring to FIG. 6A 4 parallel plies are layed-up each along the 0 degrees axis i.e. P1(0), P2(0), P3(0) and P4(0).

The lay-up machine is then repositioned with respect to the mandrel and the second series of parallel plies are layed-up over the top of the first series of plies The second series of plies P1(45), P2(45), P3(45) and P4(45) are layed-up directly on top of the first series of plies of the sub-layer, again separated by a distance substantially equal to the width of a ply.

As shown in FIG. 6C a third series of parallel plies, P1(−45), P2(−45), P3(−45) and P4(−45) are layed-up in the same way.

In effect, and although not illustrated by the relative positions of FIGS. 6A to 6C, the plies in 6B are layed over the plies in 6A and the plies in 6C are layed over the plies in 6B.

The next stage of the formation of the sub-layer is to lay plies in between adjacent plies in each of the three directions (or however many directions there might be). Thus a further series of parallel plies are layed-up in alignment with the spaces between adjacent plies shown in FIGS. 6A to 6C.

This is illustrated in FIGS. 6A to 6C by the arrows A, B and C. These additional plies are layed-up over the plies formed by the lay-up steps described above. The plies may be layed-up in the same sequence i.e. 0 degrees, +45 and −45 but the plies may be layed-up in an alternative order. Whichever order is selected all of the spaces defined between adjacent plies in the same direction are 'filled in'.

The resulting sub-layer thus comprises a plurality of parallel plies in a plurality of directions where the plies are, in effect, woven within other plies in other directions. This interwoven arrangement of plies in the sub-layer substantially improves the structural strength of the sub-layer. For example, the propensity for a crack to propagate through a sub-layer layed-up to in this manner is substantially reduced because there is no clear path for the crack to travel along. In effect the normal path which might lead to the failure of the component is interrupted by the interaction of the plies on different individual layers of the sub-layer.

Figure 7:
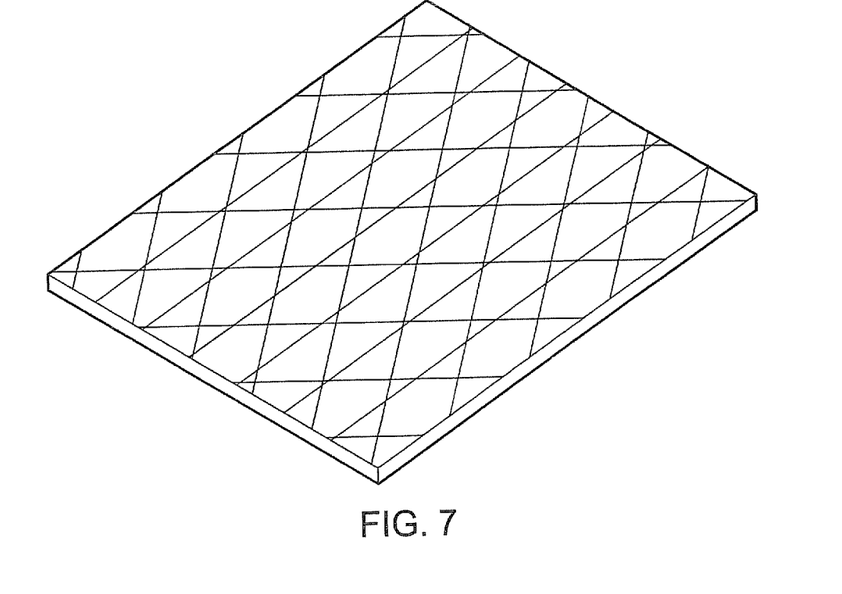
FIG. 7 illustrates a completed sub-layer.

The resulting sub-layer can be illustrated in FIG. 7 where some portions of plies in each direction are visible. It will be recognised that this lay-up method for each sub-layer can be applied in a curved or cylindrical arrangement.

FIGS. 8A to 8D illustrate one advantageous lay-up sequence of plies. The sequence shown in FIG. 8A to 8D illustrates a single sub-layer comprising 4 plies in two directions.

Figure 8A:
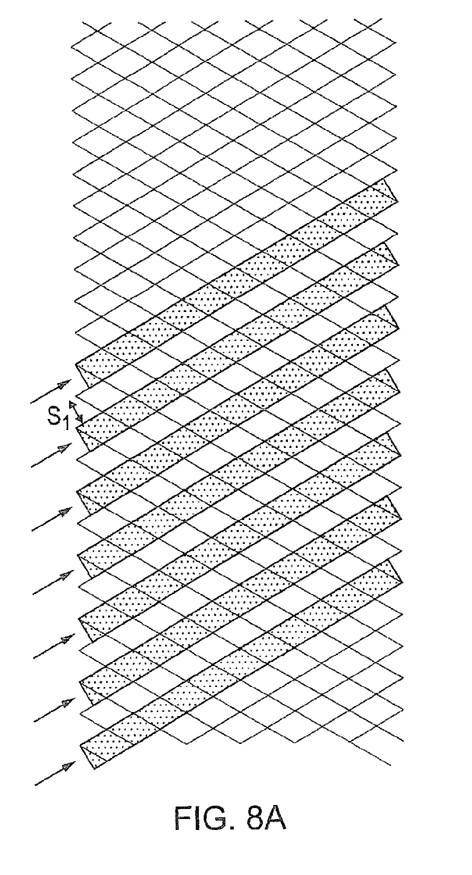
FIG. 8A to 8D show a particular lay-up sequence of plies.
Figure 8B:
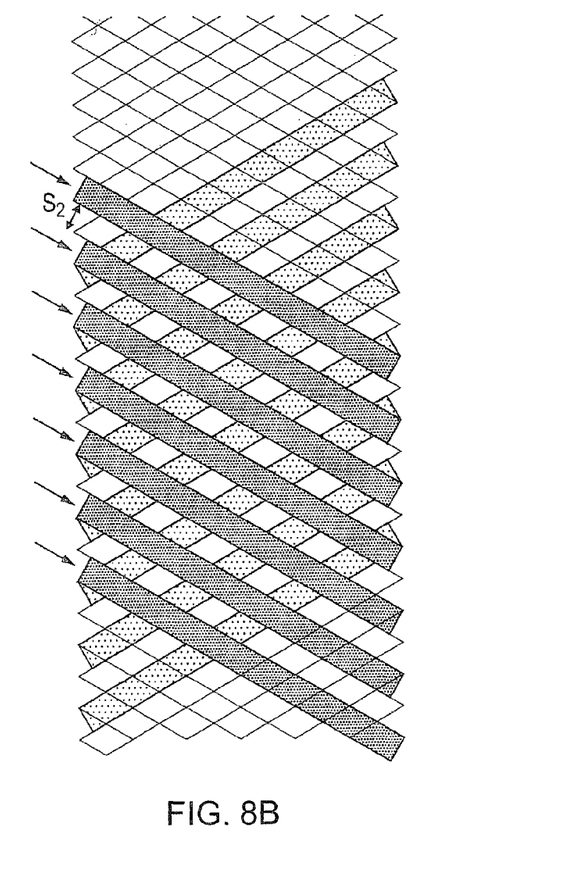

Referring to FIG. 8A a first series of parallel plies is layed-up as shown by the series of arrows. Each ply is separated by a distance (illustrated by $S_1$) which is equal to the width of a ply. FIG. 8B shows the next step in the sequence where a second series of parallel plies are layed-up, again illustrated by the arrows. Here, the parallel plies are separated by space $S_2$.

Figure 8C:
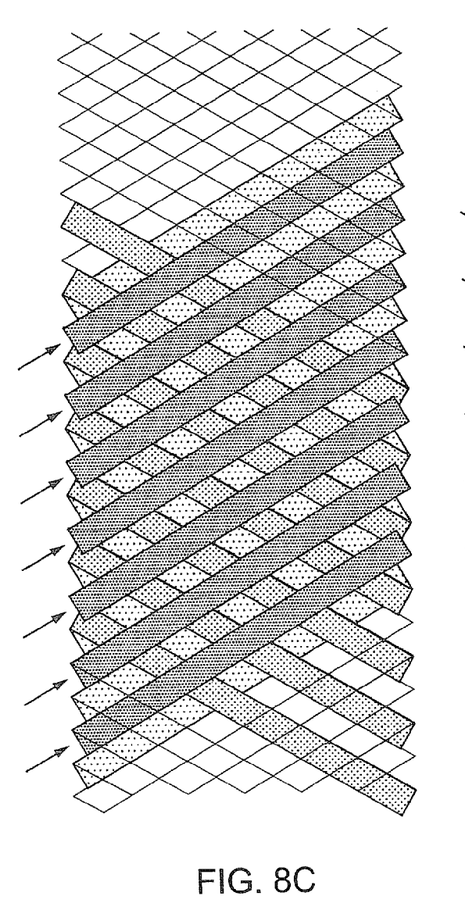
Figure 8D:
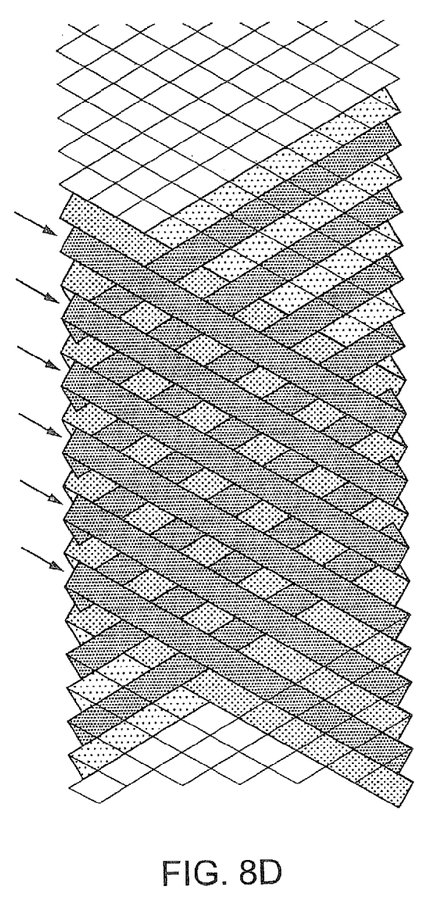

FIG. 8C illustrates the third step where a series of parallel plies are layed-up in the spaces defined between the plies layed-up in FIG. 8A i.e. along the path defined by the space $S_1$. Finally, referring to FIG. 8D, a series of parallel plies are layed-up along the path defined by the space $S_2$ in FIG. 8B.

FIGS. 8A to 8D show a two direction 4 ply lay-up sequence but it will be appreciated that any number of plies may form the sub-layer in any number of directions. The advantageous feature is the separation of plies and the laying-up of plies in the spaces defined between adjacent plies. This results in a complex interweaving of the tape fibres. Once cured the complex interactions provide for a significant improvement in strength and impact resistance.

As stated above, this can be advantageously used in combination with a displacement of plies in consecutive sub-layers thereby creating a composite component comprising both (a) complex interwoven fibres and (b) off-set tape boundaries preventing crack propagation or delamination.

The example shown in FIG. 8A to 8D is a method of manufacturing a single sub-layer. The stack comprises a plurality of these sub-layers each layed-up over another adjacent sub-layer and optionally displaced from a preceding sub-layer in and x and/or a y direction as shown for example in FIG. 1B and in FIG. 9.

The alignment of consecutive sub-layers with respect to each other will now be described.

FIG. 9 illustrates the off-set or 'mis-alignment' of each sub-layer with respect to another.

As discussed above each sub-layer is offset by a predetermined distance with respect to the preceding sub-layer. This can be measured by off-setting the start position of the lay-up machine when it commencing laying-up of each of the sub-layers. By off-setting the start position each of the boundaries i.e. edges of the plies will be off-set with respect to plies extending in the same direction but being part of a preceding sub-layer.

The off-set distance may be any suitable distance but is advantageously determined by dividing the ply width by the number of sub-layers forming the stack. This allows for the predetermination of a constant a.

The offset distance is therefore a=width of ply/number of plies per sub-layer

The lay-up machine is then programmed to offset the start position with respect to a predetermined datum which can be conveniently set as the lay up start position of the very first ply of the first sub-layer. Referring to FIG. 6A this might for example be point.

Point A defining the datum is also shown in FIG. 9 as the start position for the first sub-layer. FIG. 9 illustrates 8 sub-layers, each sub-layer formed as described above. The off-set distance a are also shown in FIG. 9. The first sub-layer is not offset and is therefore commenced at position 0 corresponding to Point 9. The plies forming the sub-layer are then layed-up as described above laying down plies in a plurality of directions and then filling in the defined spaces there between with further plies.

The next and subsequent sub-layers are layed-up according to the following displacements. These displacements or offset are measured from the datum line 12 extending through the stack from Point A as illustrated in FIG. 9.

The displacements alternate either side of the datum as follows:

0, −a, +a, −2a+2a, −a, +a and 0.

Thus, the start position for laying up each sub-layer is offset with respect to a preceding sub-layer which misaligns all of the ply boundaries in the various sub-layers.

Alternative displacement patterns may be used but it has been established that this pattern optimises the separation of the plies thereby optimising structural performance.

The example shown in FIG. 9 is a displacement in a single direction. For example the displacement distance 'a' could be measured along the axis x shown in FIG. 6A. It will be recognised that this will offset the end boundaries or butt joints extending across the width of the plies. The offset could equally be applied in the y direction thereby offsetting the boundaries of plies extending in a longitudinal direction i.e. the length edge or butt joint of the tape forming the ply.

Advantageously the offset may be applied simultaneously in both the x and y directions. Thus the butt joints defining both the width and lengths of the tapes forming the plies can be offset from plies in the same direction and in different sub-layers. This optimises the strength of the component since there is misalignment in both directions.

It will be recognised that the lay-up process can be fully automated. The lay up process can be performed to lay up each consecutive ply forming the sub-layer and then proceed to lay-up the next ply forming the first layer of the second and subsequent sub-layers without interruption. This allows a component to be manufactured in a single automated process.

Finally the layed-up stack is cured by means of an autoclave or by curing the stack in-situ on the mandrel or tool onto which the stack has been layed-up. Curing techniques are understood by the person skilled in the art and are not therefore described herein.

Although the components described in the specific description are planar or generally cylindrical it will be recognised that any shape or combination may be used. For example a blade, such as for an aircraft or wind turbine could employ this method.

Aspects of the invention extend to components formed according to the method and to components comprising multiple layers wherein plies in subsequent layers are offset as described above. The invention is particularly advantageous where the component is required to absorb an impact and/or to exhibit a smooth surface finish.

There has been described:

A method of forming a composite component, said component comprising a series of sub-layers together forming a composite stack, each sub-layer comprising a plurality of plies; said method comprising the steps of: selecting a start position for laying up a first sub-layer of plies; laying-up from said position a plurality of plies to form a first sub-layer; and laying-up a plurality of subsequent sub-layers of composite plies each layed-up on top of a preceding sub-layer; wherein the start position for laying-up each subsequent sub-layer is selected so as to be displaced laterally with respect to the start position of the preceding sub-layer.

A method according to any preceding claim wherein the lay-up start position of the first sub-layer defines a datum extending from the first to the final sub-layer of the composite stack and wherein the lay-up start position of each subsequent sub-layer is displaced so as to alternate between each side of said datum.

A method of making a composite component, said component comprising a stack of composite plies grouped into discrete sub-groups of plies, each sub-group positioned immediately on top of a preceding sub-group; wherein each sub-group is lay-up such that lines defining the edge of a ply extending in a first direction in said sub-group do not directly overlap with lines defining an edge of a ply extending in the same direction in another one of said sub-groups of said stack.

A composite component comprising a stack of composite plies grouped into discrete sub-groups of plies, each sub-group positioned immediately on top of a preceding sub-group; wherein each sub-group is arranged such that a line defining the edge of a ply extending in a first direction does not directly overlap with a line defining an edge of a ply extending in the same direction in one of the other of said sub-groups of said stack A method of forming a composite component, said component comprising a series of sub-layers together forming a composite stack, each sub-layer comprising a plurality of plies; said method comprising the steps of: laying-up a plurality of plies to form each sub-layer wherein the plies forming each sub-layer are arranged to extend in a plurality of directions and wherein plies layed-up in the same direction are separated from adjacent plies by a distance substantially equal to the width of the ply.

The invention claimed is:

1. A method of forming a composite component, said component comprising a series of sub-layers together forming a composite stack, each sub-layer comprising a plurality of plies;

said method comprising the steps of:

selecting a start position for laying up a first sub-layer of plies;

laying-up from said position four or more plies to form a first sub-layer; and laying-up a plurality of subsequent sub-layers of four or more plies each layed-up on top of a preceding sub-layer;

wherein the start position for laying-up each subsequent sub-layer is selected so as to be displaced laterally with respect to the start position of the preceding sublayer; and further wherein the lay-up start position of the first sub-layer defines a datum extending through each of the four or more plies in each of the sub-layers from the first to the final sub-layer of the composite stack and wherein the lay-up start position of each subsequent sub-layer is displaced so as to alternate between each side of said datum.

2. A method according to claim 1, wherein each ply is in the form of an elongate tape, each ply having a first axis extending along the length of the tape and a second axis across the width of the tape, wherein the lateral displacement is a lateral displacement with respect to the first and or second axis of a corresponding ply in a preceding sub-layer.

3. A method as claimed in claim 1, wherein the displacement of each lay-up start position of each subsequent sub-layer is selected so that the start position of each sub-layer is displaced laterally with respect to all of the preceding layers.

4. A method according to claim 1, wherein each sub-layer is formed of a plurality of layers of plies.

5. A method of claim 4, wherein the plies forming each sub-layer are arranged to extend in a plurality of directions and wherein a plurality of plies are layed-up in each direction.

6. A method of claim 5, wherein plies layed-up in the same direction are separated from adjacent plies by a distance substantially equal to the width of the ply.

7. A method according to claim 6, wherein a plurality of plies are layed-up in a first direction and then a plurality of plies are layed-up in a second and subsequent directions and wherein when plies have been layed-up in each of the directions, plies are then layed-up in the spaces defined between the adjacent plies in each of said directions.

8. A method according to claim 1, wherein all of the plies are of equal widths, and a predetermined displacement distance a is determined by dividing the width any one of the plies by the number of plies per sub-layer, and wherein the lay-up start position of each subsequent sub-layer is displaced relative to said datum according to the following sequence position:

0, +a, −a, +2a, −2a, −a, +a, 0;

wherein the predetermined distance a is measured along at least one of a first axis and a second axis of the plies.

9. A method according to claim 1 wherein the pies are elongate tapes pre-impregnated with an epoxy resin.

10. A method according to claim 1 wherein the component is substantially planar.

11. A method according to claim 1 wherein the component is cylindrical and wherein at least some plies are arranged in a spiral configuration around said component.

12. A method according to claim 11, wherein the plies are layed-up onto a cylindrical mandrel.

13. A method according to claim 1 wherein the lay-up start position defines a butt joint between adjacent plies and/or sub-layers.

14. A method according to claim 1 wherein the layed-up composite stack is cured to consolidate the resin in each ply and sub-layer.

* * * * *